(12) United States Patent
Azaola Sáenz

(10) Patent No.: US 8,203,482 B2
(45) Date of Patent: Jun. 19, 2012

(54) METHOD FOR AUTONOMOUS DETERMINATION OF PROTECTION LEVELS FOR GNSS POSITIONING BASED ON NAVIGATION RESIDUALS AND AN ISOTROPIC CONFIDENCE RATIO

(75) Inventor: Miguel Azaola Sáenz, Madrid (ES)

(73) Assignee: GMV Aerospace and Defence S.A. (ES)

( * ) Notice: Subject to any disclaimer, the term of this patent is extended or adjusted under 35 U.S.C. 154(b) by 454 days.

(21) Appl. No.: 12/429,687

(22) Filed: Apr. 24, 2009

(65) Prior Publication Data

US 2009/0273515 A1 Nov. 5, 2009

(30) Foreign Application Priority Data

Apr. 30, 2008 (EP) .................................... 08380133

(51) Int. Cl.
 *G01S 19/40* (2010.01)
 *G01S 19/44* (2010.01)
 *G01S 19/32* (2010.01)
(52) U.S. Cl. .......... 342/357.23; 342/357.27; 342/357.72

(58) Field of Classification Search ............. 342/357.23, 342/357.27, 357.72
See application file for complete search history.

(56) References Cited

U.S. PATENT DOCUMENTS

| | | | |
|---|---|---|---|
| 6,205,377 B1 | 3/2001 | Lupash et al. |
| 6,281,836 B1 | 8/2001 | Lupash et al. |
| 6,847,893 B1 | 1/2005 | Lupash et al. |
| 7,219,013 B1 | 5/2007 | Young et al. |

FOREIGN PATENT DOCUMENTS

| | | |
|---|---|---|
| EP | 1 729 145 A | 12/2006 |
| EP | 1 811 480 A | 7/2007 |

OTHER PUBLICATIONS

European Search Report dated Nov. 3, 2008, issued in European priority application No. EP 08 380 133.2.

*Primary Examiner* — Thomas H. Tarcza
*Assistant Examiner* — Frank J McGue
(74) *Attorney, Agent, or Firm* — Ostrolenk Faber LLP

(57) ABSTRACT

The present invention relates to a method for computing autonomous horizontal and vertical Protection Levels for least squares-based GNSS positioning, based on navigation residuals and an isotropic confidence ratio.

7 Claims, No Drawings

METHOD FOR AUTONOMOUS DETERMINATION OF PROTECTION LEVELS FOR GNSS POSITIONING BASED ON NAVIGATION RESIDUALS AND AN ISOTROPIC CONFIDENCE RATIO

CROSS REFERENCE TO RELATED APPLICATION

This application claims priority under 35 U.S.C. §119 of European Patent Application No. 08 380 133.2, filed 30 Apr. 2008, entitled METHOD FOR AUTONOMOUS DETERMINATION OF PROTECTION LEVELS FOR GNSS POSITIONING BASED ON NAVIGATION RESIDUALS AND AN ISOTROPIC CONFIDENCE RATIO, the complete disclosure of which is hereby incorporated by reference for all purposes.

FIELD OF THE INVENTION

The present invention arose in the field of satellite-based navigation (or GNSS), but it is applicable in any field in which least squares estimation is used. The invention gives response to the need for reliable bounds to the position error in a variety of applications of GNSS navigation, ranging from civil aviation to electronic (road) fee collection, among others.

BACKGROUND OF THE INVENTION

The GNSS navigation problem is the problem of estimating the position of a GNSS user by means of the information provided by the GNSS signal as received by a GNSS user receiver.

There are several standard GNSS navigation techniques, the most common of which is absolute navigation. In absolute navigation, the navigation system computes its absolute position with no more information than that contained in the GNSS satellite signals, by means of so-called pseudo-range measurements (noisy measurements of the distance between the receiver and the GNSS satellites based on the determination of the travel time of the GNSS signals from the satellites to the receiver). For that purpose, it is necessary to synchronise the receiver clock with the GNSS system time (to which the GNSS satellite clocks are supposed to be steered to a very high accuracy). In other words, in absolute navigation mode, the receiver must estimate its clock bias in order to be able to estimate its position. Both position and clock bias are usually estimated simultaneously in a common least squares linear estimation process. The number of parameters to be estimated in this navigation mode is thus four: three position coordinates plus the clock bias.

Other standard GNSS navigation techniques include differential navigation and kinematics navigation. In both cases the receiver computes its position relative to a GNSS station, taking advantage of the GNSS signal observations acquired by the station. This eliminates the need for an accurate receiver clock synchronisation, since the receiver can combine the observations from the station with its own observations in such a way that the receiver clock bias contribution cancels out, thus allowing for a three (instead of four) parameter state estimation.

As far as the present invention is concerned, there is no difference between relative, kinematic or even absolute GNSS navigation techniques, as long as they are based on least squares estimation. So let's briefly introduce the least squares GNSS navigation technique in a generic form in which the presence or absence of the clock bias as a component of the estimation vector is transparent. This is standard theory and can be found in the literature (see e.g. "*Understanding GPS: Principles and Applications*", Elliot D. Kaplan & Christopher J. Hegarty (editors), 2006), so we will not go into all the details.

In any GNSS navigation mode the estimation problem to be solved is non-linear, so as linear least squares estimation methods are going to be applied (which are also standard in GNSS navigation), the navigation problem must first be linearised. Let us call $\eta$ the actual user state vector (with three or four parameters depending on the navigation mode). The linearization requires an initial guess of $\eta$ that will be denoted $\eta_0$, around which to differentiate the non-linear GNSS observation equations. The resulting linear estimation problem can be written as:

$$y = H \cdot x + \epsilon \qquad [\text{Eq. 1}]$$

where:

The vector x is the state innovation $x = \eta - \eta_0$, that is, the difference between the state guess $\eta_0$ and the true state $\eta$, and hence is what must be estimated in order to solve de navigation problem.

The observation vector y is formed with the difference between the actual measurements (e.g. pseudo-range measurements in the case of absolute navigation), which are obtained from the position defined by the actual state $\eta$, and the (fictitious) measurements that would be obtained if the receiver were in the position defined by the guessed state $\eta_0$.

The error vector $\epsilon$ is the vector of measurement errors (e.g. pseudo-range errors).

The observation matrix H (sometimes also called geometry matrix) is the (Jacobian) matrix of partial derivatives of the non-linear GNSS observation equation in the state guess $\eta_0$, and hence relates small innovations of the state around $\eta_0$ with small innovations of the measurements as expected at $\eta_0$.

As far as the present invention is concerned, the actual form of the non-linear GNSS observation equation or how the observation matrix H is derived from it, are not relevant topics, so we will not go into such details (which, on the other hand, are of standard use in GNSS least squares navigation and can be learned from many GNSS literature sources as, for instance, "*Global Positioning System: Theory & Applications*", Bradford W. Parkinson & James J. Spilker (editors), 1996). The important fact is that H relates the state innovation, observation and error vectors as stated in equation Eq. 1.

Note that the vectors y and $\epsilon$ have as many coordinates as observations are available, e.g. as simultaneous pseudo-range measurements are available at a the moment in which the position is to be computed, in the case of absolute navigation, or as the number of double-differenced phase measurements in the case of kinematic navigation. It is assumed that there are n observations available. Then the vectors y and $\epsilon$ have n coordinates, whereas x has m coordinates and H has size n×m (m being three or four depending on the type of navigation). Note also that the vector y and the matrix H are known, the state innovation vector x is the one to be estimated and the error vector $\epsilon$ will always remain unknown (or otherwise it could be possible correct the errors and there would be no errors at all, which is impossible).

The least squares estimate of x is given by the well-known formula:

$$\hat{x} = (H^T \cdot H)^{-1} H^T \cdot y$$

It provides an estimate $\hat{x}$ of the state innovation x, which in turn provides an estimation $\hat{\eta} = \eta_0 + \hat{x}$ of the state $\eta = \eta_0 + x$. The estimation error δ is the difference between the estimated state $\hat{\eta}$ and the actual state η which in turn is the same as the difference between the estimated state innovation $\hat{x}$ and the actual state innovation x:

$$\delta = \hat{\eta} - \eta = \hat{x} = x$$

So far the basics of a standard GNSS navigation technique (GNSS navigation by means of least squares) have been described. Let us now define accurately the notion that constitutes the main concern of the present invention: the Protection Level.

The protection level (PL) is a bound, up to a given confidence level 1−α, to the error of the estimation of the GNSS position solution, i.e. a bound on the size relation between the positioning error or one of its components (e.g. vertical or horizontal component) and the residual vector resulting from the position calculation itself.

So, a protection level with confidence 1−α for the least squares navigation solution described above is a positive number PL such that:

$$P(\|\delta\| \geq PL) \leq \alpha$$

where P is the probability operator.

Note that δ is always unknown, and that is the reason why we want to bound it.

The concept of Protection Level is usually particularized to a subset of the coordinates of the state vector; note that δ has three spatial components (plus the clock bias component in the case of absolute navigation). If the coordinate system used is the local horizon system at $\hat{\eta}$ (and so it will be assumed in what follows), then the vector δ is also expressed in local horizon coordinates, and hence its three spatial components represent the estimation errors in the directions East, North and Up ($\delta_E$, $\delta_N$ and $\delta_U$, respectively). It is not unusual that a particular GNSS application is specially interested in a bound for just one of the components (e.g. the vertical component $\delta_U$, as in the case of civil aviation) or a subset of them (e.g., the horizontal components $\delta_E$ and $\delta_N$, as in the case of electronic road fee collection).

A vertical protection level with confidence 1−α for the least squares navigation solution described above is a positive number VPL such that:

$$P(\|\delta_U\| \geq VPL) \leq \alpha$$

A horizontal protection level with confidence 1−α for the least squares navigation solution described above is a positive number HPL such that:

$$P(\|\delta_H\| \geq HPL) \leq \alpha$$

where $$\delta_H = \begin{bmatrix} \delta_E \\ \delta_N \end{bmatrix}$$

is the horizontal component of the estimation error vector δ.

This concept of Protection Level arose as the core of the GNSS Integrity concept that was developed for Satellite Based Augmentation Systems (SBAS), such as the American WAAS or the European EGNOS among others, and has been applied specifically to those systems as well as to Ground Base Augmentation Systems (GBAS) such as LAAS. Both SBAS and GBAS are systems that provide real time corrections and integrity information applicable to GNSS observations. Civil aircrafts equipped with special GNSS navigation units can receive those corrections and apply them to their GNSS observations, as well as the integrity information, in the form of statistical bounds (i.e. bounds up to a certain statistical confidence level) to the observation errors that remain after applying the corrections. Thus the on-board GNSS unit can achieve a more accurate estimate of its position (thanks to corrections) and, moreover, can compute a Protection Level, which is a statistical bound to the remaining position error (thanks to the statistical bounds to observation errors that are broadcast by the system).

Besides, autonomous methods for computing a Protection Level (autonomous meaning that they do not depend on corrections or any extra information coming from an augmentation system such as a SBAS or a GBAS) have been defined in the frame of the so-called RAIM methods (Receiver Autonomous Integrity Monitoring). The RAIM concept aims to provide an integrity layer to the GNSS navigation process, implementing techniques for detecting and isolating faulty measurements (that is, measurements with excessive error) along with the mentioned Protection Levels for statistically bounding the position estimation error. Such PL computation methods are, however, difficult to justify from a theoretical point of view, since they rely on hypotheses that rarely hold in real world.

The present invention provides a robust and consistent—from a theoretical point of view—method for autonomously computing Protection Levels based on one single and verisimilar hypothesis, thus solving the weaknesses of previously existing methods.

DESCRIPTION OF THE INVENTION

The present invention relates to a method for autonomous computation of protection levels for GNSS positioning according to claim 1. Preferred embodiments of the method are defined in the dependent claims.

According to the method of the present invention, statistically consistent receiver autonomous protection levels—both horizontal and vertical—are computed. They are applicable to a least squares based GNSS navigation solution, and as such, they are applicable to different navigation techniques from absolute positioning to differential and relative, and also for multiple constellation solutions.

The present invention provides a method for computing Protection Levels which is autonomous (like the method for computing PLs provided by RAIM algorithms), that is, the Protection Levels are computed without any external information about the statistical nature of the measurement errors (unlike the PLs computed with GBAS o SBAS, which require an external source of information and/or some hypotheses about the size or statistical distribution of the individual measurement errors).

Nevertheless, the present invention differs from RAIM methods in the following: in order to make up for the lack of statistical information of the measurement errors (which in an external augmentation system such as SBAS or GBAS provides), when computing PLs RAIM methods use a statistical model for such measurement errors. Said statistical model usually includes, among others, the hypothesis that each individual measurement error is a normally distributed random variable with known variance or with a known bound to its variance (and, in some cases, null mean is also assumed for such distribution).

The method of the present invention does not make any hypothesis about the statistical behaviour of the errors of the individual measurements, but it is based on only one hypothesis—which will be called isotropy—that such measurement errors combine in an error vector which can point in any direction (of the measurement space) with the same probability. Roughly speaking, isotropy can be understood as:

Measurement errors are pair-wise statistically independent.

Measurement errors are pair-wise statistically similar.

Note that we are making no assumptions about the statistical distribution of each individual measurement error, but only on the way they relate to each other.

As such, the method of the present invention allows to bound the estimation error of any least squares estimation process whose observations reasonably satisfy the isotropy hypothesis.

A first aspect of the invention relates to a method for the computation of a horizontal protection level HPL and a vertical protection level VPL, that bound up to a given confidence level $1-\alpha$ the horizontal and vertical components, respectively, of the position estimation error $\delta$ of a least squares-based GNSS navigation solution, according to the following expressions:

$$HPL = k \cdot \|r\| \cdot a_H,$$

$$VPL = k \cdot \|r\| \cdot a_V$$

where:

$\|r\|$ is the Euclidean norm of the least squares estimation residuals vector r;

$a_H$ is the semi-major axis of the 2-dimensional ellipse defined by the horizontal components of the DoP matrix $(H^T \cdot H)^{-1}$ as:

$$a_H = \sqrt{\frac{h_{EE} + h_{NN}}{2} + \sqrt{\left(\frac{h_{EE} - h_{NN}}{2}\right)^2 + \left(\frac{h_{EN} + h_{NE}}{2}\right)^2}}, \text{ and}$$

$a_V$ is the semi-major axis of the 1-dimensional ellipse defined by the vertical components of the DoP matrix as:

$$a_V = \sqrt{h_{UU}}, \text{ where}$$

$h_{EE}$, $h_{NN}$, $h_{EN}$, $h_{NE}$, $h_{EU}$, $h_{UU}$, $h_{NU}$, $h_{UN}$ are the spatial components of the dilution of precision matrix DoP $(H^T \cdot H)^{-1}$ of the least squares estimation expressed in the local horizontal coordinate system of the estimated position, where subscripts E, N and U stand for East, North and Up components, respectively, and their combinations correspond to their correlations and cross-correlations:

$$(H^T \cdot H)^{-1}_{Space} = \begin{bmatrix} h_{EE} & h_{EN} & h_{EU} \\ h_{NE} & h_{NN} & h_{NU} \\ h_{UE} & h_{UN} & h_{UU} \end{bmatrix},$$

H is the n×m observation matrix of the least squares-based navigation solution;

and where k is an isotropic confidence ratio computed by numerically solving the following expression Eq. 3 which links k with n; m and $\alpha$, n and m being the number of observations and the number of estimated parameters of the least squares estimation:

$$\Gamma\left(\frac{n}{2}\right) \cdot \int_{z \in \mathbb{R}^m, z^2 \leq \frac{k^2}{1+k^2}} (1-z^2)^{\frac{n-m-2}{2}} \cdot dz = \Gamma\left(\frac{n-m}{2}\right) \cdot \pi^{\frac{m}{2}} \cdot (1-\alpha) \quad [\text{Eq. 3}]$$

where:

$\Gamma$ is Euler's Gamma function; and, $\mathfrak{R}^m$ denotes a standard m-dimensional real vector space.

In the case where m=4, that is, in GNSS absolute navigation solution, k may be computed by numerically solving the following expression Eq. 4, which also links k with n, m and $\alpha$:

$$\alpha = \frac{n-2}{2} \cdot (1+k^2)^{\frac{4-n}{2}} - \frac{n-4}{2} \cdot (1+k^2)^{\frac{2-n}{2}}. \quad [\text{Eq. 4}]$$

As indicated before, the present invention is applicable to relative, kinematic or absolute GNSS navigation techniques, as long as they are based on least squares estimation.

Also, the least squares estimation can be a weighted least squares estimation, that is, the vector r is not just the least squares estimation residuals vector r, but the result of normalising the vector of residuals (which will be called $r_0$ in this case to avoid confusion) with a non-singular matrix R, and the observation matrix H is not just the observation matrix, but the result of normalising the observation matrix (which will be called $H_0$ here to avoid confusion) with the same non-singular matrix R used to normalise the residuals $r_0$. So:

$$r = R \cdot r_0$$

$$(H^t \cdot H)^{-1} = (H_0^t \cdot R^t \cdot R \cdot H_0)^{-1}$$

The matrix $W = R^t \cdot R$ is usually called the weighting matrix in standard weighted least squares estimation theory.

The isotropic confidence ratio k can be obtained by looking it up in a table, which table includes values of k previously calculated by numerically solving equation Eq. 3 for a given set of values of n, m and $\alpha$. And so k can also be obtained by interpolating between calculated values of k in said table.

The method of the present invention may also further comprise, for a given measurement epoch and for a fixed confidence level (which are provided as input):

computing the horizontal protection level HPL and/or the vertical protection level VPL for all possible combinations of m+1 or more of the n available observations;

searching for the solution whose horizontal or vertical protection level is the smallest among all such combinations, and taking such solution and protection level as output.

That is, it is possible to optimise the protection level obtained: it is checked if any combination of m+1 of the available observations produces a protection level—horizontal or vertical—that is smaller than the protection level produced by the full set of available measurements. In such case, the smallest protection level among those resulting from all such combinations, along with its associated position, is taken as the solution.

As indicated before, the method of the present invention is based in the hypothesis of isotropy. According to the invention, the isotropic confidence ratio k is defined as a positive number that satisfies:

$$P(\|s\| \geq k \cdot \|r\|) = \alpha$$

or, equivalently:

$$P(s^2 \geq k^2 \cdot r^2) = \alpha$$

where r, $r = y - H \cdot \hat{x}$, is the residual of the least squares estimation (as stated in the Background of the Invention, where the least square estimation applied is described), and $s = H \cdot \delta$, the image through H of the estimation error vector $\delta$.

(In the previous equation and in what follows, squaring of vectors, such as r and s, shall be understood as taking the square of their Euclidean norm.)

Let us show how this isotropic confidence ratio k, together with the residual vector r and the DoP matrix $(H^T \cdot H)^{-1}$ are a means to obtain the desired protection levels PLs. So let us suppose a number k satisfying $P(s^2 \geq k^2 \cdot r^2) = \alpha$ has already been found. If the interest is the horizontal protection level (HPL), an horizontal protection region (HPR) is defined as:

$$HPR = \left\{ \begin{bmatrix} x_E \\ x_N \end{bmatrix} : \exists x_U, x_C \mid [x_E \ x_N \ x_U \ x_C] \cdot H^T \cdot H \cdot \begin{bmatrix} x_E \\ x_N \\ x_U \\ x_C \end{bmatrix} \leq k^2 \cdot r^2 \right\}$$

Now we consider the horizontal component $\delta_H$ of the state estimation error $\delta$, $$\delta_H = \begin{bmatrix} \delta_E \\ \delta_N \end{bmatrix}.$$

It is known by construction that $P(\delta^T \cdot H^T \cdot H \cdot \delta \leq k^2 \cdot r^2) = 1 - \alpha$. Therefore, the probability that $\delta_H$ is inside the horizontal protection region is:

$$P\left( \begin{bmatrix} \delta_E \\ \delta_N \end{bmatrix} \in HPR \right) =$$

$$P\left( \exists x_U, x_C \mid [\delta_E \ \delta_N \ x_U \ x_C] \cdot H^T \cdot H \cdot \begin{bmatrix} \delta_E \\ \delta_N \\ x_U \\ x_C \end{bmatrix} \leq k^2 \cdot r^2 \right)$$

Hence, $$P\left( \begin{bmatrix} \delta_E \\ \delta_N \end{bmatrix} \in HPR \right) \geq P\left( [\delta_E \ \delta_N \ \delta_U \ \delta_C] \cdot H^T \cdot H \cdot \begin{bmatrix} \delta_E \\ \delta_N \\ \delta_U \\ \delta_C \end{bmatrix} \leq k^2 \cdot r^2 \right) = 1 - \alpha$$

Analogously, a vertical protection region (VPR) can be computed as:

$$VPR = \left\{ x_U : \exists x_E, x_N, x_C \mid [x_E \ x_N \ x_U \ x_C] \cdot H^T \cdot H \cdot \begin{bmatrix} x_E \\ x_N \\ x_U \\ x_C \end{bmatrix} \leq k^2 \cdot r^2 \right\}$$

The VPR satisfies the analogous probability inequality:

$$P(\delta_U \in VPR) \geq 1 - \alpha$$

In the horizontal case, the protection region is a centred ellipse, and the maximum norm is the semi-major axis of the ellipse. In the vertical case, the protection region is a centred segment, and the maximum norm is half the length of the segment. In both cases, the maximum norm of the region can be obtained from the DoP matrix $(H^T \cdot H)^{-1}$. The DoP matrix can be expressed in local horizon coordinates at $\hat{\eta}$ as:

$$(H^T \cdot H)^{-1} = \begin{bmatrix} h_{EE} & h_{EN} & h_{EU} & \dots \\ h_{NE} & h_{NN} & h_{NU} & \dots \\ h_{UE} & h_{UN} & h_{UU} & \dots \\ \vdots & \vdots & \vdots & \ddots \end{bmatrix}$$

where the subscripts E, N and U stand for the East, North and Up components, respectively, and their combinations correspond to their correlations and cross-correlations, and the dots represent the fact that there can be other rows and columns corresponding to other estimated parameters (e.g. the clock bias in the case of absolute navigation).

For the purposes of the present invention, only the spatial components of the DoP matrix are relevant:

$$(H^T \cdot H)^{-1}_{Space} = \begin{bmatrix} h_{EE} & h_{EN} & h_{EU} \\ h_{NE} & h_{NN} & h_{NU} \\ h_{UE} & h_{UN} & h_{UU} \end{bmatrix}.$$

In these conditions it can be shown (e.g. by means of Lagrange's multipliers theorem) that the maximum norm in the horizontal region (e.g. the semi-major axis of the ellipse) can be obtained as:

$$a_H = \sqrt{\frac{h_{EE} + h_{NN}}{2} + \sqrt{\left(\frac{h_{EE} - h_{NN}}{2}\right)^2 + \left(\frac{h_{EN} + h_{NE}}{2}\right)^2}}$$

and in the vertical region as:

$$a_V = \sqrt{h_{UU}}.$$

Therefore the desired HPL and VPL can be obtained as:

$$HPL = k \cdot \|r\| \cdot a_H, \quad VPL = k \cdot \|r\| \cdot a_V,$$

where k is the isotropic confidence ratio related to a given the confidence level $1 - \alpha$ and the numbers n and m of observations and parameters to be estimated, respectively.

The condition that has to be held is $P(s^2 \geq k^2 \cdot r^2) = \alpha$ or, equivalently:

$$P\left( \frac{s^2}{\varepsilon^2} \geq k^2 \cdot \frac{r^2}{\varepsilon^2} \right) = \alpha$$

In order to satisfy the preceding equation (which refers to a probability measure) some information is necessary about the probability distribution of the elements involved. For that purpose, one and only hypothesis is assumed on which the whole method relies, which is the isotropy hypothesis (that gives its name to the value k to be obtained): vector $$\tilde{\varepsilon} = \frac{\varepsilon}{\|\varepsilon\|}$$

defines a uniformly distributed random point in the (n−1)-dimensional unit sphere (i.e. in the unit sphere of the n-dimensional space).

In other words, the isotropy hypothesis states that, within the n-dimensional space in which it lives, the vector δ can point in any direction with the same probability.

It can be observes that:

$$r = y - H \cdot \hat{x} = H \cdot x + \epsilon - H \cdot \hat{x} = \epsilon - H \cdot (\hat{x} - x) = \epsilon - H \cdot \delta = \epsilon - s, \text{ that is,}$$
$$\epsilon = r + s.$$

On the other hand, r and s are orthogonal:

$$s^T \cdot r = (\hat{x} - x)^T \cdot H^T (y - H \cdot \hat{x}) = (\hat{x} - x)^T \cdot H^T \cdot (I - H \cdot (H^T \cdot H)^{-1} \cdot H^T) \cdot y = (\hat{x} - x)^T \cdot H^T \cdot y - (\hat{x} - x)^T \cdot H^T \cdot y = 0$$

Hence r and s define an orthogonal decomposition of ε, and thus Pythagoras' Theorem can be invoked: $r^2 + s^2 = \epsilon^2$. Let us define:

$$\tilde{\epsilon} = \frac{\epsilon}{\|\epsilon\|}; \tilde{r} = \frac{r}{\|\epsilon\|}; \tilde{s} = \frac{s}{\|\epsilon\|}$$

It follows that $\tilde{r}^2 + \tilde{s}^2 = 1$ and that $\tilde{\epsilon}^2 = 1$. Moreover, by the isotropy hypothesis, $\tilde{\epsilon}$ is a random unit vector that distributes uniformly in the unit sphere of the n-dimensional measurement space. Now, the condition we want to be satisfied can be written as:

$$P(\tilde{s}^2 \geq k^2 \cdot \tilde{r}^2) = \alpha$$

Since $\tilde{r}^2 + \tilde{s}^2 = 1$, $\tilde{r}$ can be eliminated from the condition:

$$\alpha = P(\tilde{s}^2 \geq k^2 \cdot (1 - \tilde{s}^2)) = P\left(\tilde{s}^2 \geq \frac{k^2}{1 + k^2}\right)$$

Let us call $$\rho = \sqrt{\frac{k^2}{1 + k^2}}.$$

Observe that ρ∈[0,1). Our condition translates into:

$$P(\|\tilde{s}\| \leq \rho) = 1 - \alpha \qquad [\text{Eq. 2}]$$

Our goal now is to obtain a (more explicit) formula that relates ρ and α. Let us compute the left hand side of the preceding equation for a generic ρ∈[0,1).

Let $S_d(\tau)$ denote the sphere of radius τ and dimension d (generic) and let V denote the volume operator that corresponds to the dimension of its operand (e.g. $V(S_1(\tau)) = 2\pi\tau$ is the perimeter of the circle and $V(S_2(\tau)) = 4\pi\tau^2$ is the surface of the 2-sphere, which is, the sphere in the 3-space).

Since $\tilde{\epsilon}$ distributes uniformly in the unit sphere of the n-dimensional space (that is, in the sphere $S_{n-1}(1)$ of dimension n−1 and unitary radius), the probability that $\tilde{\epsilon}$ lies in any region $D_{n-1}$ of the sphere can be computed as the (n−1)-volume of that region normalised with (i.e. divided by) the total (n−1)-volume of the sphere:

$$P(\tilde{\epsilon} \in D_{n-1}) = \frac{\int_{\tilde{\epsilon} \in D_{n-1}} d\tilde{\epsilon}}{V(S_{n-1}(1))}$$

The vector $\tilde{s}$ is just the orthogonal projection of $\tilde{\epsilon}$ into a m-dimensional subspace, which is the subspace image through H of the m-dimensional state space (where m takes the value 3 or 4 depending on the type of navigation technique that is being used) so:

$$P(\|\tilde{s}\| \leq \rho) = P(\tilde{\epsilon} \in D_{n-1})$$

where $$D_{n-1} = \left\{ \begin{bmatrix} \tilde{r} \\ \tilde{s} \end{bmatrix} \in S_{n-1}(1) : 0 \leq \tilde{s}^2 \leq \rho^2 \right\}$$

$$= \left\{ \begin{bmatrix} \tilde{r} \\ \tilde{s} \end{bmatrix} : 0 \leq \tilde{s}^2 \leq \rho^2, \tilde{r}^2 = 1 - \tilde{s}^2 \right\}$$

Let us consider the following region of the m-dimensional state space image:

$$D_m = \{\tilde{s} : 0 \leq \tilde{s}^2 \leq \rho^2\}$$

The region $D_{n-1}$ can be described as:

$$D_{n-1} = \left\{ \begin{bmatrix} \tilde{r} \\ \tilde{s} \end{bmatrix} : \tilde{s} \in D_m, \tilde{r} \in S_{n-1-m}\left(\sqrt{1 - \tilde{s}^2}\right) \right\}$$

It can thus be computed:

$$\int_{\tilde{\epsilon} \in D_{n-1}} d\tilde{\epsilon} = \int_{\tilde{s} \in D_m} \frac{1}{\sqrt{1 - \tilde{s}^2}} \cdot V\left(S_{n-s}\left(\sqrt{1 - \tilde{s}^2}\right)\right) \cdot d\tilde{s}$$

where the factor $$\frac{1}{\sqrt{1 - \tilde{s}^2}}$$

represents the volume deformation due to the projection from a spherical region $D_{n-1}$ into a planar one $D_m$. Note that it is implicitly assumed that n>m (i.e. that there are more observations than parameters to estimate). This corresponds to the intuitive idea that redundancy of observations is necessary in order to provide protection levels.

From the previous equation it follows that:

$$P(\|\tilde{s}\| \leq \rho) = \int_{\tilde{s} \in D_m} \frac{1}{\sqrt{1 - \tilde{s}^2}} \cdot \frac{V\left(S_{n-1-m}\left(\sqrt{1 - \tilde{s}^2}\right)\right)}{V(S_{n-1}(1))} \cdot d\tilde{s}$$

The general formula for the volume of a (d−1)-sphere with radius τ is:

$$V(S_{d-1}(\tau)) = \frac{2 \cdot \pi^{\frac{d}{2}}}{\Gamma\left(\frac{d}{2}\right)} \cdot \tau^{d-1}$$

where Γ is Euler's Gamma function. Therefore, $$\frac{V\left(S_{n-1-m}\left(\sqrt{1-\tilde{s}^2}\right)\right)}{V(S_{n-1}(1))} = \pi^{-\frac{m}{2}} \cdot \frac{\Gamma\left(\frac{n}{2}\right)}{\Gamma\left(\frac{n-m}{2}\right)} \cdot (1-\tilde{s}^2)^{\frac{n-m-1}{2}}$$

and thus we obtain:

$$P(\|\tilde{s}\| \leq \rho) = \pi^{-\frac{m}{2}} \cdot \frac{\Gamma\left(\frac{n}{2}\right)}{\Gamma\left(\frac{n-m}{2}\right)} \cdot \int_{\tilde{s} \in D_m} (1-\tilde{s}^2)^{\frac{n-m-2}{2}} \cdot d\tilde{s}$$

Recalling the definitions of $D_m$ and ρ and substituting equation Eq. 2, the equation that relates k, α, n and m is obtained:

$$\Gamma\left(\frac{n}{2}\right) \cdot \int_{z \in \mathbb{R}^m, z^2 \leq \frac{k^2}{1+k^2}} (1-z^2)^{\frac{n-m-2}{2}} \cdot dz = \Gamma\left(\frac{n-m}{2}\right) \cdot \pi^{\frac{m}{2}} \cdot (1-\alpha) \quad [\text{Eq. 3}]$$

where $\Re^m$ denotes the standard m-dimensional real vector space (i.e. the space of vectors with m real coordinates). Note that the integral on the left-hand side of Equation Eq.3 is a multivariate integral (actually a m-variate integral).

The isotropic confidence ratio k cannot be worked out from equation Eq. 3 as a function of n, m and α. But the equation can be solved numerically in k given the values of n, m and α. For the purpose of computation efficiency, such numerical solutions can be pre-computed and tabulated for a convenient set of values of n, m and α, convenient for the context to which the present PL computation method is to be applied, thus avoiding the need for solving equation Eq.3 in real time applications. Numerical solving of equation Eq.3 would then be substituted in real time by simply looking up or interpolating in the table.

DETAILED DESCRIPTION OF THE PREFERRED EMBODIMENTS

The method of the present invention computes protection levels, horizontal and vertical, that bound, up to a given confidence level 1−α, the corresponding components of the position estimation error of a least squares-based GNSS navigation solution. And for that purpose, according to a preferred embodiment:

Receives as input (or by configuration) the value or values of the parameter α that define the confidence level or levels 1−α for which protection levels are to be computed.

Receives as input (or by configuration) the number m of parameters to be estimated (e.g. four in absolute navigation, three in relative or kinematic navigation).

Receives as input the number n of observations used in the least squares estimation.

Receives as input the vector r of least squares estimation residuals (possibly normalised with a weighting matrix).

Receives as input the DoP matrix $(H^t \cdot H)^{-1}$ of the least squares estimation (normalised with the same weighting matrix as the vector r if so is r) expressed in the local horizon coordinates of the estimated position.

Obtains an isotropic confidence ratio k by numerically solving the following equation, which relates k with n, m and α:

$$\Gamma\left(\frac{n}{2}\right) \cdot \int_{z \in \mathbb{R}^m, z^2 \leq \frac{k^2}{1+k^2}} (1-z^2)^{\frac{n-m-2}{2}} \cdot dz = \Gamma\left(\frac{n-m}{2}\right) \cdot \pi^{\frac{m}{2}} \cdot (1-\alpha) \quad [\text{Eq. 3}]$$

where $\Re^m$ denotes the standard m-dimensional real vector space (i.e. the space of vectors with m real coordinates). Note that the integral on the left-hand side of Equation Eq. 3 is a multivariate integral (actually a m-variate integral).

Computes the semi-major axis $a_H$ of the 2-dimensional ellipse defined by the horizontal components of the DoP matrix as:

$$a_H = \sqrt{\frac{h_{EE}+h_{NN}}{2} + \sqrt{\left(\frac{h_{EE}-h_{NN}}{2}\right)^2 + \left(\frac{h_{EN}+h_{NE}}{2}\right)^2}}.$$

Computes the semi-major axis $a_V$ of the 1-dimensional ellipse (i.e. the interval) defined by the horizontal components of the DoP matrix as:

$$a_V = \sqrt{h_{UU}}.$$

Computes the Euclidean norm $\|r\|$ of the residual vector r.
And finally, obtains the horizontal protection level HPL and the vertical protection level VPL as:

$$\text{HPL}=k \cdot \|r\| \cdot a_H, \quad \text{VPL}=k \cdot \|r\| \cdot a_V,$$

Unfortunately k cannot be worked out from Equation Eq. 3 as a function of n, m and α. However, the equation can be solved numerically in k given the values of n, m and α. For the purpose of computation efficiency, such numerical solutions can be pre-computed and tabulated for a convenient set of values of n, m and α, convenient for the context to which the present PL computation method is to be applied, thus avoiding the need for solving equation Eq. 3 in real time applications. Numerical solving of equation Eq. 3 would then be substituted in real time by simply looking up or interpolating in the table.

For instance, if the method of the invention is to be applied to absolute GNSS navigation (m=4), assuming a GNSS satellite constellation of up to 60 satellites (e.g. GPS+Galileo) from which a typical user will never see more than 24 at the same time, equation Eq. 3 can be solved for all n between 5 and 24 and for a set of values of α of interest (say α=$10^{-i}$, i=1, 2, . . . , 7). If, for instance, we restrict to civil aviation GNSS navigation, we can consider those values of α that correspond to civil aviation requirements for the different flight phases (e.g. α=$5 \cdot 10^{-9}$ for HPL in non-precision approach, α=$10^{-7}$ for VPL in precision approach).

As an example, considering the cases m=4 and m=3, that correspond to the GNSS absolute and relative/kinematic navigation problems, respectively, equation Eq. 3 has been numerically solved to obtain the values of k for all combinations of the values n=5, 6, . . . , 15 and α=$10^{-1}$, $10^{-2}$, . . . , $10^{-7}$.

The resulting values of k are shown in the following tables Table 0-1 and Table 0-2, respectively:

TABLE 0-1

Values of k as a function of n and α for m = 4

| n | $10^{-1}$ | $10^{-2}$ | $10^{-3}$ | $10^{-4}$ | $10^{-5}$ | $10^{-6}$ | $10^{-7}$ |
|---|---|---|---|---|---|---|---|
| 5 | 14.94429 | 149.99444 | 1500.0 | 15000.0 | 150000.0 | 1500000.0 | 15000000.0 |
| 6 | 4.299632 | 14.088958 | 44.704577 | 141.416177 | 447.211073 | 1414.21277 | 4472.13179 |
| 7 | 2.668993 | 6.187072 | 13.520371 | 29.216247 | 62.984863 | 135.715594 | 292.399371 |
| 8 | 2.026635 | 3.997127 | 7.309982 | 13.109950 | 23.374947 | 41.601852 | 73.999232 |
| 9 | 1.678141 | 3.018864 | 4.986783 | 8.026302 | 12.797176 | 20.330060 | 32.251152 |
| 10 | 1.456197 | 2.469589 | 3.823047 | 5.739841 | 8.510512 | 12.549471 | 18.459272 |
| 11 | 1.300667 | 2.117498 | 3.134872 | 4.486298 | 6.324878 | 8.853090 | 12.347554 |
| 12 | 1.184573 | 1.871641 | 2.682497 | 3.707618 | 5.038610 | 6.788587 | 9.104306 |
| 13 | 1.093959 | 1.689456 | 2.362703 | 3.180923 | 4.204431 | 5.502947 | 7.162882 |
| 14 | 1.020850 | 1.548462 | 2.124406 | 2.802147 | 3.624479 | 4.637763 | 5.897057 |
| 15 | 0.960339 | 1.435688 | 1.939645 | 2.516931 | 3.199782 | 4.020948 | 5.017760 |

TABLE 0-2

Values of k as a function of n and α for m = 3

| n | $10^{-1}$ | $10^{-2}$ | $10^{-3}$ | $10^{-4}$ | $10^{-5}$ | $10^{-6}$ | $10^{-7}$ |
|---|---|---|---|---|---|---|---|
| 5 | 12.6798949 | 127.318718 | 1273.23902 | 12732.3954 | 127323.955 | 1273239.55 | 12732395.5 |
| 6 | 3.70711279 | 12.1962823 | 38.7136918 | 122.469384 | 387.296721 | 1224.74436 | 3872.98319 |
| 7 | 2.32180389 | 5.42740225 | 11.8789083 | 25.6776176 | 55.3602373 | 119.288334 | 257.007427 |
| 8 | 1.7728918 | 3.53847099 | 6.49098539 | 11.6517568 | 20.7809015 | 36.9883721 | 65.7948352 |
| 9 | 1.47366429 | 2.68997625 | 4.46334829 | 7.1954831 | 11.4796911 | 18.2415346 | 28.9407583 |
| 10 | 1.28233412 | 2.21128223 | 3.44262318 | 5.18074906 | 7.6894481 | 11.3440256 | 16.6897284 |
| 11 | 1.14780635 | 1.90314984 | 2.83641649 | 4.07131698 | 5.74811729 | 8.05159284 | 11.2338222 |
| 12 | 1.04710248 | 1.68719352 | 2.4364028 | 3.37950465 | 4.60116217 | 6.20532948 | 8.32659438 |
| 13 | 0.96830832 | 1.52664307 | 2.15265752 | 2.90996207 | 3.85476998 | 5.05158679 | 6.58012529 |
| 14 | 0.90460043 | 1.40203201 | 1.94057301 | 2.57124221 | 3.33424766 | 4.27275924 | 5.43784769 |
| 15 | 0.85177281 | 1.30210283 | 1.77567855 | 2.31547192 | 2.95200181 | 3.71595894 | 4.64215202 |

The present invention relates to a method for computing autonomous horizontal and vertical Protection Levels for least squares-based GNSS positioning, based on navigation residuals and an isotropic confidence ratio. It is to be understood that the above disclosure is an exemplification of the principles of the invention and does not limit the invention to said embodiments.

What is claimed is:

1. A GNSS-based positioning device comprising a receiver that computes a horizontal protection level (HPL) or a vertical protection level (VPL), that bound, up to a given confidence level 1−α, the horizontal and vertical components, respectively, of the position estimation error δ of a least squares-based GNSS navigation solution with a number m of estimated parameters, which navigation solution is based on n observations and an n×m observation matrix H and which navigation solution also provides a residuals vector r, and sets off or displays an alarm if said HPL or VPL exceeds an application-defined horizontal or vertical error tolerance threshold; and wherein the receiver computes the horizontal protection level HPL or the vertical protection level VPL according to one of the following expressions:

$$HPL = k \cdot \|r\| \cdot a_H,$$

$$VPL = k \cdot \|r\| \cdot a_v,$$

where:

$\|r\|$ is the Euclidean norm of the least squares estimation residuals vector r;

$a_H$ is defined as: $a_H = \sqrt{\dfrac{h_{EE} + h_{NN}}{2} + \sqrt{\left(\dfrac{h_{EE} - h_{NN}}{2}\right)^2 + \left(\dfrac{h_{EN} + h_{NE}}{2}\right)^2}}$, and $a_V$ is defined as: $a_V = \sqrt{h_{UU}}$, where $h_{EE}, h_{NN}, h_{EN}, h_{NE}, h_{EU}, h_{UE}, h_{UU}, h_{NU}, h_{UN}$ are the spatial components of the dilution of precision matrix DoP $(H^T \cdot H)^{-1}$ of the least squares estimation expressed in the local horizontal coordinate system of the estimated position, where subscripts E, N and U stand for East, North and Up components, respectively, and their combinations correspond to their correlations and cross-correlations:

$$(H^T \cdot H)^{-1}_{Space} = \begin{bmatrix} h_{EE} & h_{EN} & h_{EU} \\ h_{NE} & h_{NN} & h_{NU} \\ h_{UE} & h_{UN} & h_{UU} \end{bmatrix};$$

and where k is an isotropic confidence ratio computed by numerically solving the following expression Eq. 3 which links k with n, m and α:

$$\Gamma\left(\frac{n}{2}\right) \cdot \int_{z \in \mathbb{R}^m, z^2 \le \frac{k^2}{1+k^2}} (1-z^2)^{\frac{n-m-2}{2}} \cdot dz = \Gamma\left(\frac{n-m}{2}\right) \cdot \pi^{\frac{m}{2}} \cdot (1-\alpha) \quad \text{[Eq. 3]}$$

where:
 $\Gamma$ is Euler's Gamma function; and,
 $\mathfrak{R}^m$ denotes a standard m-dimensional real vector space.

2. The GNSS-based positioning device according to claim 1, wherein when m=4 in the GNSS absolute navigation solution, k is computed by numerically solving the following expression Eq. 4 which links k with n, m and $\alpha$:

$$\alpha = \frac{n-2}{2} \cdot (1+k^2)^{\frac{4-n}{2}} - \frac{n-4}{2} \cdot (1+k^2)^{\frac{2-n}{2}}. \quad \text{[Eq. 4]}$$

3. The GNSS-based positioning device according to claim 1, wherein the least squares estimation is a weighted least squares estimation, wherein both the least squares observation matrix H, which is used to compute the dilution of precision matrix DoP, and the least squares residual vector r are normalised with a non-singular matrix R.

4. The GNSS-based positioning device according to claim 1, wherein k is obtained by looking it up in a table that includes values of k previously calculated by numerically solving expression Eq. 3 for a given set of values of n, m and $\alpha$.

5. The GNSS-based positioning device according to claim 4, wherein k is obtained by interpolating between calculated values of k in said table.

6. The GNSS-based positioning device according to claim 1, which, for a given measurement epoch and for a fixed confidence level, further comprises:
 computing the horizontal protection level HPL or the vertical protection level VPL for all possible combinations of m+1 or more of the n available observations;
 searching for the solution whose horizontal or vertical protection level is the smallest among all such combinations, and taking such solution and protection level as output.

7. A method for computing protection levels, comprising:
 computing a horizontal protection level (HPL) or a vertical protection level (VPL) to bound, up to a given confidence level 1−$\alpha$, the horizontal and vertical components, respectively, of the position estimation error $\delta$ of a least squares-based GNSS navigation solution with a number in of estimated parameters, which navigation solution is based on n observations and an n×observation matrix H and which navigation solution also provides a residuals vector r; wherein the horizontal protection level HPL or vertical protection level VPL are computed according to one of the following expressions:

$$\text{HPL} = k \cdot \|r\| \cdot a_H,$$

$$\text{VPL} = k \cdot \|r\| \cdot a_V$$

where:
 $\|r\|$ is the Euclidean norm of the least squares estimation residuals vector r;

$a_H$ is defined as:

$$a_H = \sqrt{\frac{h_{EE} + h_{NN}}{2} + \sqrt{\left(\frac{h_{EE} - h_{NN}}{2}\right)^2 + \left(\frac{h_{EN} - h_{NE}}{2}\right)^2}},$$

and
 $a_V$ is defined as: $a_V = \sqrt{h_{UU}}$, where
 $h_{EE}, h_{NN}, h_{EN}, h_{NE}, h_{EU}, h_{UE}, h_{UU}, h_{NU}, h_{UN}$ are the spatial components of the dilution of precision matrix DoP $(H^T \cdot H)^{-1}$ of the least squares estimation expressed in the local horizontal coordinate system of the estimated position, where subscripts E, N and U stand for East, North and Up components, respectively, and their combinations correspond to their correlations and cross-correlations:

$$(H^T \cdot H)^{-1}_{Space} = \begin{bmatrix} h_{EE} & h_{EN} & h_{EU} \\ h_{NE} & h_{NN} & h_{NU} \\ h_{UE} & h_{UN} & h_{UU} \end{bmatrix};$$

and where
 k is an isotropic confidence ratio computed by numerically solving the following expression Eq. 3 which links k with n, m and $\alpha$:

$$\Gamma\left(\frac{n}{2}\right) \cdot \int_{z \in \mathfrak{R}^m, z^2 \le \frac{k^2}{1+k^2}} (1-z^2)^{\frac{n-m-2}{2}} \cdot dz = \Gamma\left(\frac{n-m}{2}\right) \cdot \pi^{\frac{m}{2}} \cdot (1-\alpha) \quad \text{[Eq. 3]}$$

where:
 $\Gamma$ is Euler's Gamma function; and,
 $\mathfrak{R}$ denotes a standard m-dimensional real vector space; and
 setting off or displaying an alarm if said HPL or VPL exceeds an application-defined horizontal or vertical error tolerance threshold.

* * * * *